United States Patent
Byun et al.

(10) Patent No.: US 11,908,170 B2
(45) Date of Patent: Feb. 20, 2024

(54) MULTI-LEVEL TRANSFERABLE REGION-BASED DOMAIN ADAPTIVE OBJECT DETECTION APPARATUS AND METHOD

(71) Applicant: UIF (University Industry Foundation), Yonsei University, Seoul (KR)

(72) Inventors: Hye Ran Byun, Seoul (KR); Mi Rae Do, Seoul (KR); Seog Kyu Jeon, Seoul (KR); Ki Beom Hong, Seoul (KR)

(73) Assignee: UIF (UNIVERSITY INDUSTRY FOUNDATION), YONSEI UNIVERSITY, Seoul (KR)

( * ) Notice: Subject to any disclaimer, the term of this patent is extended or adjusted under 35 U.S.C. 154(b) by 130 days.

(21) Appl. No.: 17/540,757

(22) Filed: Dec. 2, 2021

(65) Prior Publication Data
US 2023/0129263 A1  Apr. 27, 2023

(30) Foreign Application Priority Data
Oct. 22, 2021 (KR) .......................... 10-2021-0141635

(51) Int. Cl.
*G06K 9/00* (2022.01)
*G06V 10/22* (2022.01)
*G06V 10/25* (2022.01)
*G06V 10/42* (2022.01)
*G06V 10/82* (2022.01)
*G06F 18/25* (2023.01)
(Continued)

(52) U.S. Cl.
CPC ............ *G06V 10/22* (2022.01); *G06F 18/213* (2023.01); *G06F 18/253* (2023.01); *G06N 3/04* (2013.01); *G06V 10/25* (2022.01); *G06V 10/42* (2022.01); *G06V 10/82* (2022.01)

(58) Field of Classification Search
CPC ........ G06V 10/22; G06V 10/25; G06V 10/42; G06V 10/82; G06V 20/58; G06F 18/213; G06F 18/253; G06N 3/04
See application file for complete search history.

(56) References Cited

U.S. PATENT DOCUMENTS 11,544,495 B2 * 1/2023 Singh .................... G06V 10/774
2021/0027098 A1 * 1/2021 Ge .......................... G06F 18/217
(Continued)

FOREIGN PATENT DOCUMENTS

KR   10-2020-0038846 A   4/2020

OTHER PUBLICATIONS

Cross-domain Object Detection through Coarse-to-Fine Feature Adaptation by Yangtao Zheng (Year: 2020).*

Primary Examiner — Dhaval V Patel
(74) *Attorney, Agent, or Firm* — Paratus Law Group, PLLC

(57) ABSTRACT

A multi-level transferable region-based domain adaptive object detection apparatus includes: an image-level feature part that extracts an image-level feature by providing unlabeled target data to a plurality of convolutional layers; an RPN-level feature part that determines region candidates by providing the image-level feature to a region proposal network (RPN) and performing RPN-level domain adaptation and transferable region filtering; and an instance-level feature part that extracts a region of interest (RoI) pooling feature by conducting dynamic instance sampling on the region candidates.

13 Claims, 12 Drawing Sheets

(51) Int. Cl.
G06F 18/213 (2023.01)
G06N 3/04 (2023.01)

(56) References Cited

U.S. PATENT DOCUMENTS

2021/0042928 A1* 2/2021 Takeda .................... G06N 3/084
2021/0056693 A1* 2/2021 Cheng ................ G06V 10/7753
2021/0090217 A1* 3/2021 Jiang ..................... G06T 3/4046
2021/0312232 A1* 10/2021 Tensmeyer .......... G06F 18/2148

* cited by examiner (a) Vanilla region filtering (b) Transferable region filtering (*Ours*)

FIG. 5

| Dataset | Method | Person | Rider | Car | Truck | Bus | Train | Motorbike | Bicycle | mAP |
|---|---|---|---|---|---|---|---|---|---|---|
| FoggyCityscapes | Source only [21] | 24.1 | 33.1 | 34.3 | 4.1 | 22.3 | 3.0 | 15.3 | 26.5 | 20.3 |
| | DA-Faster [2] | 25.0 | 31.0 | 40.5 | 22.1 | 35.3 | 20.2 | 20.0 | 27.1 | 27.6 |
| | SCDA [17] | 30.3 | 35.4 | 41.5 | 26.9 | 24.2 | 29.2 | 26.7 | 23.1 | 29.7 |
| | SW-Faster [19] | 29.9 | 42.3 | 43.5 | 24.5 | 36.2 | 32.6 | 30.0 | 35.3 | 34.3 |
| | ATF [33] | 34.6 | 47 | 50.0 | 23.7 | 43.3 | 38.7 | 33.4 | 38.8 | 38.7 |
| | HTCN [1] | 33.2 | 47.5 | 47.9 | 31.6 | 47.4 | 40.9 | 32.3 | 37.1 | 39.7 |
| | MEAA [14] | 34.2 | 48.9 | 52.4 | 30.3 | 42.7 | 46.0 | 33.2 | 36.2 | 40.5 |
| | Ours | 33.7 | 47.8 | 50.1 | 32.3 | 49.2 | 46.5 | 33.5 | 37.8 | 41.3 |
| | Oracle | 37.2 | 48.2 | 52.7 | 35.2 | 52.2 | 48.5 | 35.3 | 38.8 | 43.5 |
| BDD100K | Source only [21] | 26.9 | 22.1 | 44.7 | 17.4 | 16.7 | - | 17.1 | 18.8 | 23.4 |
| | DA-Faster [2] | 29.4 | 26.5 | 44.6 | 14.3 | 16.8 | - | 15.8 | 20.6 | 24.0 |
| | SW-Faster [19] | 30.2 | 29.5 | 45.7 | 15.2 | 18.4 | - | 17.1 | 21.2 | 25.3 |
| | MEAA* [14] | 29.2 | 30.6 | 43.5 | 20.2 | 21.5 | - | 18.8 | 23.5 | 26.5 |
| | ICR-CCR [30] | 31.4 | 31.3 | 46.3 | 19.5 | 18.9 | - | 17.3 | 23.8 | 26.9 |
| | Ours | 34.0 | 33.4 | 45.6 | 21.2 | 25.6 | - | 19.9 | 29.3 | 30.0 |

FIG. 6

| Dataset | Source-only [21] | DA-Faster [2] | SW-DA [19] | MEAA [14] | ATF [33] | SC-DA [27] | CT-DA [33] | iFAN [34] | Ours |
|---|---|---|---|---|---|---|---|---|---|
| KITTI | 30.2 | 38.5 | 37.9 | - | 42.1 | 42.5 | 43.6 | - | 44.2 |
| SIM10K | 30.2 | 38.9 | 40.1 | 42.0 | 42.8 | 43.1 | 44.5 | 46.9 | 47.1 |

FIG. 8

| Methods | MUA | TRPN (RDA, RWO) | DIS | Person | Rider | Car | Truck | Bus | Train | Motor | Bicycle | mAP | Gain |
|---|---|---|---|---|---|---|---|---|---|---|---|---|---|
| Baseline | - | - | - | 32.5 | 43.6 | 44.9 | 28.4 | 41.8 | 40.0 | 30.2 | 36.3 | 37.3 | - |
| Ours | ✓ | - | - | 32.8 | 44.7 | 45.3 | 28.8 | 44.2 | 41.0 | 31.5 | 36.8 | 38.1 | 0.8 |
| Ours | - | ✓ | - | 32.9 | 45.2 | 44.7 | 28.2 | 46.1 | 43.8 | 31.1 | 36.7 | 38.6 | 1.3 |
| Ours | ✓ | ✓ | - | 33.0 | 45.6 | 46.7 | 29.2 | 47.3 | 44.3 | 32.5 | 37.1 | 39.4 | 2.1 |
| Ours | ✓ | ✓ | - | 32.9 | 46.3 | 48.9 | 31.0 | 49.1 | 45.8 | 33.0 | 37.2 | 40.4 | 3.1 |
| Ours | ✓ | ✓ | ✓ | 33.7 | 47.8 | 50.1 | 32.3 | 49.2 | 46.5 | 33.5 | 37.8 | 41.3 | 4.0 |
| Oracle | - | - | - | 37.2 | 48.2 | 52.7 | 35.2 | 52.2 | 48.5 | 35.3 | 38.8 | 43.5 | - |

(a) Input image (b) without DIS (c) with DIS

MULTI-LEVEL TRANSFERABLE REGION-BASED DOMAIN ADAPTIVE OBJECT DETECTION APPARATUS AND METHOD

CROSS-REFERENCE TO RELATED APPLICATION

This application claims priority to Korean Patent Application No. 10-2021-0141635 (filed on Oct. 22, 2021), which is hereby incorporated by reference in its entirety.

BACKGROUND

The present disclosure relates to a domain adaptive learning technology, and more particularly, to an object detector domain adaptive learning technology that applies domain adaptation suitable for information in each stage using the entire structure of a domain adaptive object detector, and that considers interrelations among object detectors and transferrable regions.

With the recent advent of deep learning, many CNN-based object detectors have shown a drastic improvement in performance by using a learning dataset with a large amount of annotations. Also, exiting object detectors have conducted tests under the assumption that such large-scale learning data and test data have ideally the same environment. However, object detection in the real world often shows differences with learning data and an actual environment. That is, the performance of object detectors trained on large-scale data may deteriorate due to this domain gap. In autonomous driving, for example, collecting data using a simulator to train an autonomous driving model offers the advantage of collecting quantitative data for various scenarios. However, this approach, when applied in an actual driving environment, may have lower model accuracy due to the domain gap. Moreover, data collection and learning through car users all over the world have economical and practical limitations. Accordingly, there arises the need for studies of object detectors robust to various domains in order to solve these problems.

PRIOR ART DOCUMENT

[Patent Document] Korean Laid-Open Patent No. 10-2020-0038846 (Apr. 14, 2020)

SUMMARY

In existing studies, there are three stages for domain adaptation of object detectors: a feature extraction stage, a region proposal extraction stage, and a region proposal category classification stage. Particularly, domain adaptation is conducted intensively on transferable regions in the feature extraction stage.

That is, the existing approaches exploit only some information from the three stages, and overlook the essence of object detectors that their stages are closely interrelated. Accordingly, the domain adaptation method which selects only some information from the stages and overlooks interrelations, as in the existing approaches, may cause negative domain transfer.

An embodiment of the present disclosure provides an object detector domain adaptation learning technology that applies domain adaptation suitable for information in each stage using the entire structure of a domain adaptive object detector, and that considers interrelations among object detectors and transferrable regions.

According to an exemplary embodiment of the present disclosure, there is provided a multi-level transferable region-based domain adaptive object detection apparatus including: an image-level feature part that extracts an image-level feature by providing unlabeled target data to a plurality of convolutional layers; an RPN-level feature part that determines region candidates by providing the image-level feature to a region proposal network (RPN) and performing RPN-level domain adaptation and transferable region filtering; and an instance-level feature part that extracts a region of interest (RoI) pooling feature by conducting dynamic instance sampling on the region candidates.

The image-level feature part may create a transferable attention map by collecting multi-scale features of the unlabeled target data from each of the convolutional layers and fusing the multi-scale features.

The image-level feature part may create the image-level feature by multiplying the transferable attention map by a global feature.

The RPN-level feature part may generate an RPN-level domain feature by fusing a foreground feature outputted from the RPN and a domain-classified feature that has passed through a gradient reversal layer (GRL)-based domain classifier Dbox.

The RPN-level feature part may determine the region candidates by receiving the RPN-level domain feature and filtering out background regions in the transferrable region filtering process.

The instance-level feature part may adjust the number of region candidates based on a discrepancy between foreground probability and an image hardness score.

The multi-level transferable region-based domain adaptive object detection apparatus may further include an object detection part that detects an object from the unlabeled target data by providing the RoI pooling feature to deformable convolutional networks (DCN).

According to another exemplary embodiment of the present disclosure, there is provided a multi-level transferable region-based domain adaptive object detection method including: extracting an image-level feature by providing unlabeled target data to a plurality of convolutional layers; determining region candidates by providing the image-level feature to a region proposal network (RPN) and performing RPN-level domain adaptation and transferable region filtering; and extracting a region of interest (RoI) pooling feature by conducting dynamic instance sampling on the region candidates.

The extracting of an image-level feature may include creating a transferable attention map by collecting multi-scale features of the unlabeled target data from each of the convolutional layers and fusing the multi-scale features.

The extracting of an image-level feature may include creating the image-level feature by multiplying the transferable attention map by a global feature.

The extracting of an RoI pooling feature may include adjusting the number of region candidates may be adjusted based on a discrepancy between foreground probability and an image hardness score.

The multi-level transferable region-based domain adaptive object detection method may further include detecting an object from the unlabeled target data by providing the RoI pooling feature to deformable convolutional networks (DCN).

The disclosed technology may have the following effects. However, since it does not mean that a specific embodiment should include all of the following effects or only the following effects, it should not be understood that the scope of the rights of the disclosed technology is limited thereby.

A multi-level transferable region-based domain adaptive object detection apparatus and method according to the present disclosure may allow for the manufacture of an object detector capable of detecting objects in various environments and therefore reduce time and economical costs of data collection, thereby reducing additional work.

A multi-level transferable region-based domain adaptive object detection apparatus and method according to the present disclosure may enable object detection only by collecting image data and therefore accelerate the spread of platforms using an object detector regardless of various environments such as day/night, weather conditions, geography, country, etc.

BRIEF DESCRIPTION OF THE DRAWINGS

FIGS. 5 to 10 are diagrams illustrating test results according to the present disclosure.

DETAILED DESCRIPTION

Figure 1:
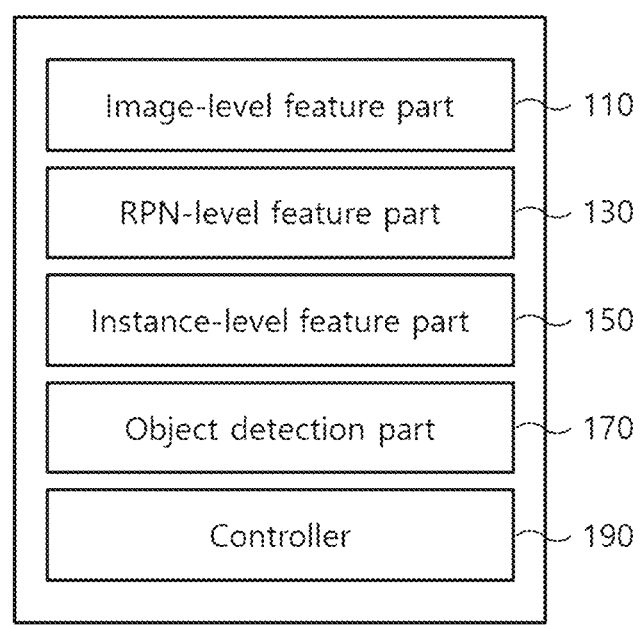
FIG. 1 is a diagram illustrating a functional configuration of a domain adaptive object detection apparatus according to the present disclosure.

The description of the present disclosure is merely an example for structural or functional explanation, and the scope of the present disclosure should not be construed as being limited by the embodiment described in the text. That is, the embodiment is to be construed as being variously embodied and having various forms, so that the scope of the present disclosure should be understood to include equivalents capable of realizing technical ideas. It should be understood that the scope of the present disclosure should not be construed as being limited thereto since the object or effect of the present disclosure is not limited to the specific embodiment.

The terms disclosed in this specification should be understood as follows.

Terms such as "first" and "second" are intended to distinguish one element from another, and the scope of the claims should not be limited by these terms. For example, a first element may be referred to as a second element, and similarly, the second element may also be referred to as the first element.

When one element is described as being "connected" to another element, it shall be construed as being connected to another element directly but also as possibly having yet another element in between. On the other hand, if one element is described as being "directly connected" to another element, it shall be construed that there is no other element in between. This is also true of other expressions for explaining a relationship between elements, i.e., "between" and "directly between" or "adjacent to" and "directly adjacent to" Unless clearly used otherwise, expressions in the singular number include a plural meaning. In the present description, expressions such as "comprise", "include", and "have" are intended to designate a characteristic, a number, a step, an operation, an element, a part or combinations thereof, and shall not be construed to preclude any presence or possibility of one or more other characteristics, numbers, steps, operations, elements, parts or combinations thereof.

Identification codes (e.g., a, b, and c) of each step are merely used for better comprehension and ease of description, not indicating a specific order of the steps, and the steps may be performed in a different order from a described order, unless clearly limited otherwise. Specifically, the steps may be performed in the same order as the described order, may substantially simultaneously be performed, or may be performed in reverse order.

The present disclosure may be embodied as computer-readable code in a computer readable recording medium, and the computer readable recording medium may include all kinds of recording devices for storing data that is readable by a computer system. Examples of the computer-readable recording medium include ROM, RAM, CD-ROM, a magnetic tape, a floppy disk, an optical data storage device, and so on. Further, the computer-readable recording medium may be distributed to a computer system connected through a network and thus store and execute computer-readable code in a distributed manner.

Unless otherwise defined, all terms used herein have the same meanings as how they are generally understood by those of ordinary skill in the art to which the disclosure pertains. Any term that is defined in a general dictionary shall be construed to have the same meaning in the context of the relevant art, and, unless otherwise defined explicitly, shall not be interpreted to have an idealistic or excessively formalistic meaning.

An unsupervised learning-based domain adaptive object detector may correspond to a methodology that uses a source domain rich with annotations and related to a target domain in order to train a model that effectively detects objects in the target domain where there are not enough or any annotations. Existing studies mostly use a two-stage object detection model using a region proposal network. Particularly, the detector is divided into three stages: 1) feature extraction stage (image-level), 2) region proposal extraction stage (rpn-level), and 3) region proposal category classification stage (instance-level), and minimizes the differences in features between the source domain and the target domain through adversarial training suitable for the characteristics of each stage by selecting some information from the three stages.

Moreover, in the existing studies, adversarial training is used to minimize the loss function of a classifier and maximize the loss function of a domain classifier. This can minimize feature differences between domains. Recent studies use a method that considers the characteristics of object detectors, in which adversarial training between two domains is conducted intensively on regions where an object of interest may be included in the feature extraction stage. That is, an adversarial training method intensive on transferrable regions may be exploited.

FIG. 1 is a diagram illustrating a functional configuration of a domain adaptive object detection apparatus according to the present disclosure.

Referring to FIG. 1, the domain adaptive object detection apparatus 100 may include an image-level feature part 110, an RPN-level feature part 130, an instance-level feature part 150, an object detection part 170, and a controller 190.

The image-level feature pan 110 may extract an image-level feature by providing unlabeled target data to a plurality of convolutional layers. The image-level feature part 110 may perform an operation in the feature extraction stage. That is, the image-level feature part 110 may perform an operation of multiplying integrated information of all features from the feature extraction stage by entropy information (uncertainty) of a domain classifier that has received this information by a final global feature. As a result, the image-level feature part 110 may have a more robust adaptive object detector trained by highlighting a domain-invariant feature against a global feature exploited in the subsequent stages while suppressing a domain-specific feature (e.g.

BACKGROUND INFORMATION

In an embodiment, the image-level feature part 110 may create a transferable attention map by collecting multi-scale features of the unlabeled target data from each of the convolutional layers and fusing the multi-scale features. Theoretically, transferable regions may be acquired through every layer in the feature extraction stage. If a transferable region is derived from low-level features, structural details such as contours but the background regions also may be regarded to be transferable, and it causes the degradation of detection performance. On the other hand, if a transferable region is derived from high-level features, contextual information for object detection may be acquired. That is, the background information is not exploited in object detection, as opposed to the low-level transferable region, and the information may be suppressed. Yet, it is easy to ignore small objects while evaluating the transferability due to the large receptive field.

Therefore, the image-level feature part 110 fuses the multi-scale features and then multiplies a map with a predicted transferable region (i.e., a transferable attention map) by a global feature, thereby minimizing the shortcomings of feature information of the existing layers and exploiting all the advantages. In an embodiment, the image-level feature part 110 may create the image-level feature by multiplying the transferable attention map by a global feature.

The RPN-level feature part 130 may determine region candidates by providing the image-level feature to a region proposal network (RPN) and performing RPN-level domain adaptation and transferable region filtering. That is, the RPN-level feature part 130 may perform an operation in the region extraction stage by exploiting a transferable region. More specifically, the RPN-level feature part 130 may extract a foreground region by considering both objectness and transferability among region samples (region proposals) generated in a general region extraction stage. To this end, the RPN-level feature part 130 may perform an RPN-level domain adaptation process and a transferable region filtering process.

In an embodiment, the RPN-level feature part 130 may generate an RPN-level domain feature by fusing a foreground feature outputted from the RPN and a domain-classified feature that has passed through a gradient reversal layer (GRL)-based domain classifier Dbox. The RPN-level feature part 130 may reduce the domain gap present in the region extraction stage through the RPN-level domain adaptation process.

In an embodiment, the RPN-level feature part 130 may determine the region candidates by receiving the RPN-level domain feature and filtering out background regions in the transferable region filtering process. The RPN-level feature part 130 may extract foreground region samples (foreground region proposals) containing domain-invariant features through the transferable region filtering process. To this end, the RPN-level feature part 130 may re-weight an objectness score by considering transferability. At this point, the re-weighting method may be conducted by using the entropy of each region generated in the RPN-level domain adaptation process as a transferability score and multiplying it by the objectness score. The re-weighted objectness score may be exploited in a non-maximum suppression step of the existing region extraction stage to create a final region of interest as a region candidate. As a result, the RPN-level feature part 130 may extract domain-invariant region candidates by considering transferability.

The instance-level feature part 150 may extract a region of interest (RoI) pooling feature by conducting dynamic instance sampling on the region candidates. In the existing region proposal category classification (instance-level), RoI proposals may be extracted through RoI pooling from multiple region proposals (or region candidates) extracted in the region proposal stage. First of all, in the case of the source domain, RoI proposals close to a correct answer box by using a correct answer box label in the extraction stage. On the contrary, since the target domain has no correct answer box, top N region proposals with a high objectness score may be extracted from the the multiple region proposals. However, the target domain generates inaccurate region proposals in early training steps, so this stetting may bring a negative effect on the overall model training stage. Thus, the instance-level feature part 150 may multiply the values of two components by N and dynamically determine the number of region proposals in the target domain by using the average of the two values.

A Kullback-Leibler divergence between the objectness scores of top N region samples from the source domain and the objectness scores of top N region samples from the target domain may be used as a first component. If the gap between the domains decreases as training proceeds, the top N region proposals of the two domains become similar in aspects. Thus, the value obtained by multiplying the value of this component by N may increase as training proceeds.

The relationship between the feature extraction stage (image-level) and region proposal category classification stage (instance-level) of an object detector may be considered as a second component. If the probability that a feature in the target domain belongs to the source domain is high by intuition, that is, similar to a feature in the source domain, a result from region proposal category classification may show high performance. Considering this, the domain probability of a domain classifier used to generate a transferable region using multi-scale features may be used as the second component. Likewise, if the gap between the domains decreases as training proceeds, the features of the two domains become similar. Thus, the value obtained by multiplying the value of this component by N may increase as training proceeds. Finally, the number of region proposals may be dynamically set by using the average of the two corresponding values.

In an embodiment, the instance-level feature part 150 may adjust the number of region candidates based on a discrepancy between foreground probability and an image hardness score. The instance-level feature part 150 may remove a negative effect caused by inaccurate target proposals in early training steps through dynamic instance sampling (DIS).

The object detection part 170 may detect an object from the unlabeled target data by providing the RoI pooling feature to deformable convolutional networks (DCN). The object detection part 170 may extract object information from an unlabeled target image by feeding the RoI pooling feature extracted through the instance-level feature part 150 into a constructed DCN. The image-level feature part 110, the RPN-level feature part 130, and the instance-level feature part 150 may apply domain adaptation suitable for information in each stage for object detection, and accordingly a final RoI pooling feature extracted through the instance-level feature part 150 may include feature information for object detection with higher accuracy.

The controller 190 may control the overall operation of the domain adaptive object detection apparatus 100, and manage the control flow or data flow among the image-level feature part 110, the RPN-level feature part 130, the instance-level feature part 150, and the object detection part 170.

Figure 2:
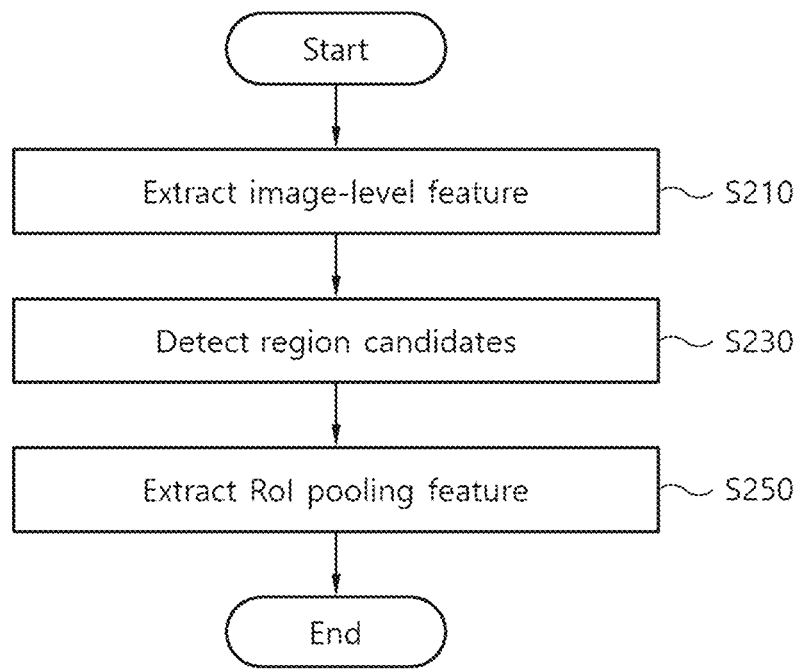
FIG. 2 is a flowchart illustrating a domain adaptive object detection method according to the present disclosure.

FIG. 2 is a flowchart illustrating a domain adaptive object detection method according to the present disclosure.

Referring to FIG. 2, the domain adaptive object detection apparatus 100 may extract an image-level feature by providing unlabeled target data to a plurality of convolutional layers through the image-level feature part 110 (step S210).

The domain adaptive object detection apparatus 100 may determine region candidates by providing the image-level feature to a region proposal network (RPN) through the RPN-level feature part 130 and performing RPN-level domain adaptation and transferable region filtering (step S230).

The domain adaptive object detection apparatus 100 may extract an RoI (region of interest) pooling feature by conducting dynamic instance sampling on the region candidates through the instance-level feature part 150 (step S250).

Hereinafter, a domain adaptive object detection method according to the present disclosure will be described in more detail with reference to FIGS. 3 to 9.

Unsupervised domain adaptation (UDA) can be deemed as a kind of transfer learning that transfers knowledge of model trained on a labeled source domain to an unlabeled target domain, where the two domains share the same task. A majority of approaches in UDA may include the marginal feature distribution between source and target domains, generative approaches, and self-training with pseudo-labels. Especially, the domain-adversarial learning method may drastically improve the domain adaptation performance, which trains the feature generators to confuse the domain discriminator via gradient reversal layer (GRL).

UDA has drawn much attention in the object detection task since the domain shift occurs frequently and annotations are costly. The pioneering work, domain adaptive Faster R-CNN (DA-Faster), reduces the domain gap in the two-stage detector. DA-faster conducts the adaptation in two levels: image-level features from the backbone and instance-level features after RoI pooling. Inspired by the work, several works aim to reduce the domain gap in image-level by hierarchical domain feature discriminator. Meanwhile, CT-DA conducts the collaborative self-training between the region proposal network (RPN) and the instance classifier. HTCN and MEAA estimate transferable regions in the image by measuring the pixel-wise domain entropy, i.e., uncertainty mask. Nevertheless, previous works overlook that all components in the object detection pipeline are indispensable and closely interrelated, conducting domain alignment only for a few components. On the contrary, the present disclosure may consider the transferability in every component.

As a baseline of the present disclosure, the Faster R-CNN which consists of a feature extractor, a region proposal network (RPN), and a fully-connected layer for the final prediction may be adopted. Firstly, a baseline detector may be trained with the fully-labeled source dataset ($D_S=\{X_s, Y_s\}$) where $X_s$ is a set of images $\{x_s\}$ and $Y_s$ is a set of ground-truth labels $\{y_s\}$. Each label $y_s$ may consist of bounding boxes with corresponding categories in $x_s$. The overall training loss is defined by the following Equation 0:

$$\mathcal{L}_{det} = \mathcal{L}_{rpn} + \mathcal{L}_{reg} + \mathcal{L}_{cls}$$ [Equation 0]

where $L_{rpn}$, $L_{reg}$, and $L_{cls}$ denote the rpn-level loss, instance-level regression loss, and classification loss, respectively.

Figure 3:
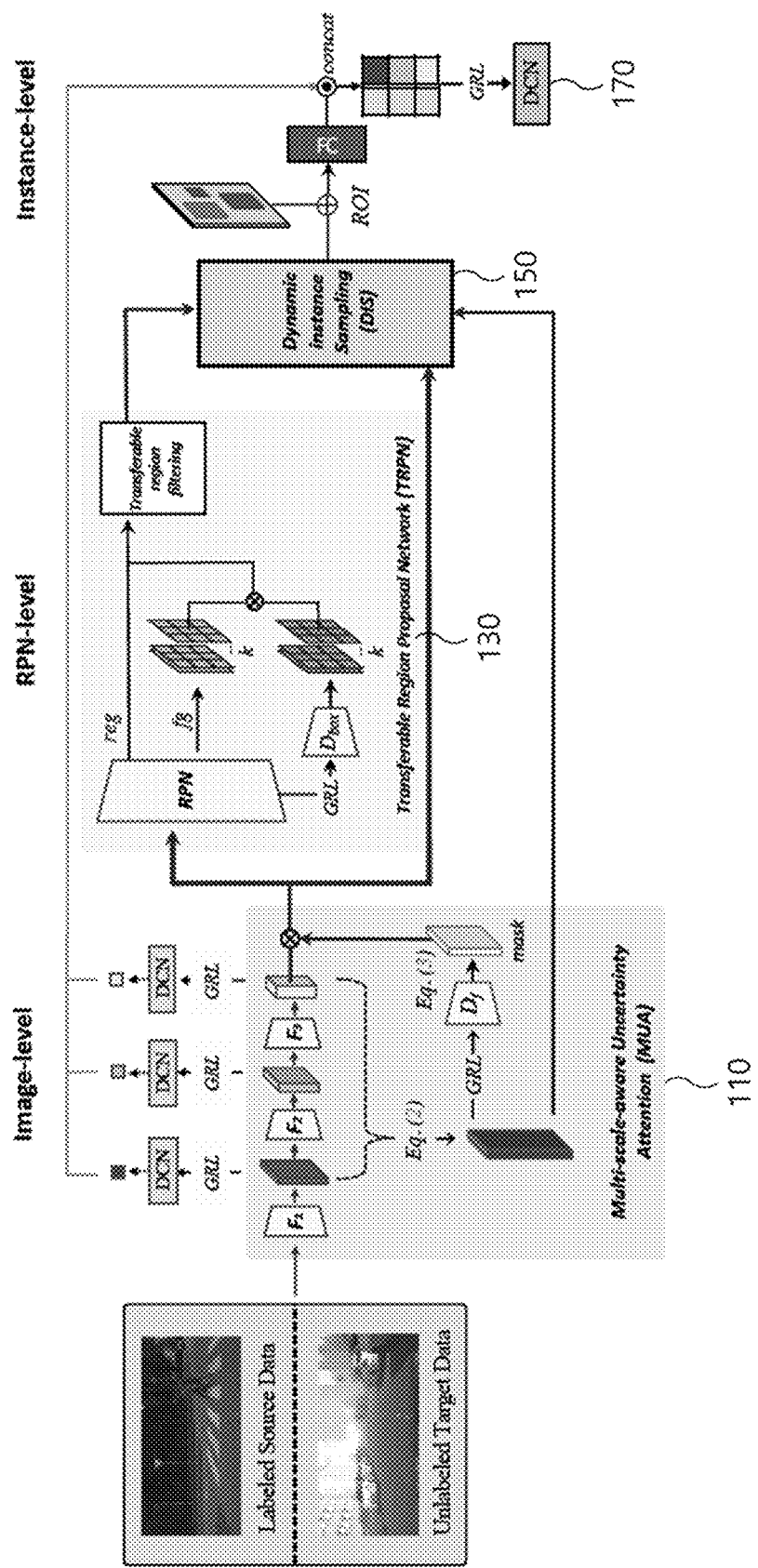
FIG. 3 is a diagram illustrating a framework of the domain adaptive object detection method according to the present disclosure.

Here, a goal of the method according to the present disclosure is to enhance the model performance on the target domain with the unlabeled datasets ($D_t=\{X_t\}$). To achieve the goal, there is a need to reduce the domain gap between the source domain and the target domain in every level: (1) image-level feature, which is extracted by backbone networks, (2) rpn-level feature, which is extracted from a fully convolutional network (i.e., RPN) that generates region proposals, and (3) instance-level feature, which denotes the RoI pooling feature before final classification and regression. Referring to FIG. 3, in this manner, the feature distributions of two domains in the overall level are aligned, and transferable regions may be derived via three modules: Multi-scale-aware Uncertainty Attention (MUA), Transferable Region Proposal Network (TRPN), and Dynamic Instance Sampling (DIS).

The principle of adaptive object detection is extracting domain-invariant semantic information of the same object categories regardless of domain. Inspired by the attention mechanism, a spatial attention map may be modelled to give guidance of transferable regions, which are indistinguishable in terms of the domain. The domain gap of each spatial position may be measured by estimating spatial uncertainty. The spatial uncertainty is calculated by the output entropy from the domain discriminator as in the following Equation 1:

$$p_{i,l} = D_f(\Phi_{i,l}) H(p_{i,l}) = -p_{i,l} \log p_{i,l}$$ [Equation 1]

where $\phi_{i,l} \in \mathbb{R}^{c_l \times H_l \times W_l}$ is the feature of i-th image after the 1-th layer, and $D_f$ refers to the pixel-wise domain discriminator. The pixel-wise entropy $H(pi,l) \in R\ Hl \times Wl$ may be estimated from the output domain probability $p_{i,j}$.

Theoretically, the entropy map $H(p_i, j)$ can be obtained regardless of the layer index 1. If $H(p_i, l)$ is derived from the low-level features, it can provide domain-invariant structural details contributing to detecting small and distant foregrounds. However, the entropy map also regards the background regions (e.g., trees and sky) to be transferable, and it causes the degradation of detection performance. On the other hand, acquiring the entropy map from high-level features can reflect the contextual information, so backgrounds are better distinguished. Yet, it is easy to ignore small objects while evaluating the transferability due to the large receptive field. Therefore, in the present disclosure, the multi-scale features may be fused, and then the uncertainty attention may be estimated, in order to minimize shortcomings and harness all advantages.

First, the features acquired from different layers may be re-scaled to make them have the same spatial resolution as the final feature. Then, the features may be concatenated, and the integrated feature may be embedded into the manifold. The multi-scale feature fusion is formulated as in the following Equation 2:

$$p_f = \mathcal{F}\;[T_i(\Phi_{i,L})]_{l=1}^{L} \quad \text{[Equation 2]}$$

where $T_i$: $\mathbb{R}\;C_l \times H_l \times W_l \to \mathbb{R}\;C_l \times H_l \times W_l \times$ denotes the bilinear interpolation function, [ ] refers to the channel-wise concatenation operator, and F is a 1×1 convolutional layer for embedding. L denotes the total number of layers in the feature extractor. With the multi-scale representation $P_f$, the multi-scale-aware uncertainty attention (MUA) may be represented as in the following Equation 3:

$$E_i = H(\hat{D}_f(p_i)) \quad \text{[Equation 3]}$$

where $\hat{D}_f$ is the domain discriminator of the fused feature $P_i$, and $E_i$ is the estimated uncertainty attention (MUA), respectively.

As the final step, the global feature may be multiplied by the spatial uncertainty attention $\Phi_{i,L} \leftarrow \Phi_{i,L} \times E_i$. Consequently, the uncertainty attention unveils transferable regions from the local and global features, greatly enhancing the ability of representation on objects of various sizes.

In the present disclosure, the novel Transferable Region Proposal Network (TRPN) may be included, which alleviates the domain gap in rpn-level and generates foreground regions by considering both the objectness and the transferability.

Previous studies expect that aligning distributions of domains in image-level and instance-level is enough for RPN to operate properly on the target domain. However, the domain discrepancy still exists in the foreground features from anchors because learning the foreground prediction is biased to the source domain data. To address this domain gap, an auxiliary domain classifier $D_{box}$ may be exploited to minimize the domain discrepancy in the rpn-level via gradient reversal layer. The box domain classification loss may be defined by the following Equation 4:

$$\mathcal{L}_{box}(\{b_{i,r}\}) = -\frac{1}{R}\sum_{i,r}(d_i \log b_{i,r} + (1-d_i)\log(1-b_{i,r})) \quad \text{[Equation 4]}$$

Here, the output probability of the domain classifier is denoted as $b_r = D_{box}(\mathcal{F}_{pn}(P_f))$, R is the number of region proposals, and r is the index of each region proposal in the i-th image. The domain label di is 0 if the image is from the source domain, otherwise 1.

Figure 4:
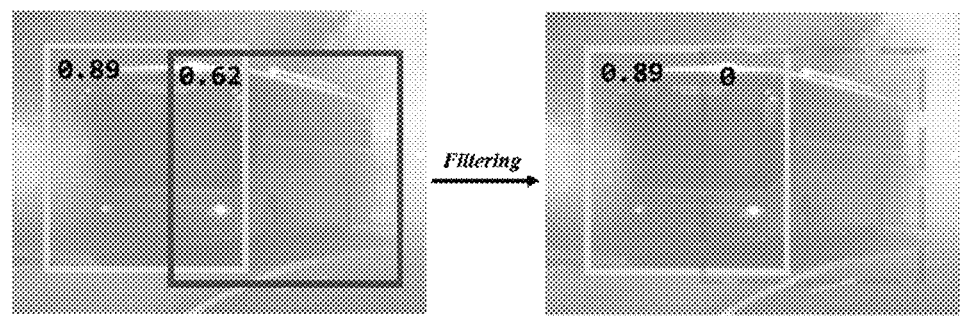
FIG. 4 is a diagram illustrating a transferable region filtering process according to the present disclosure.
Figure 4:
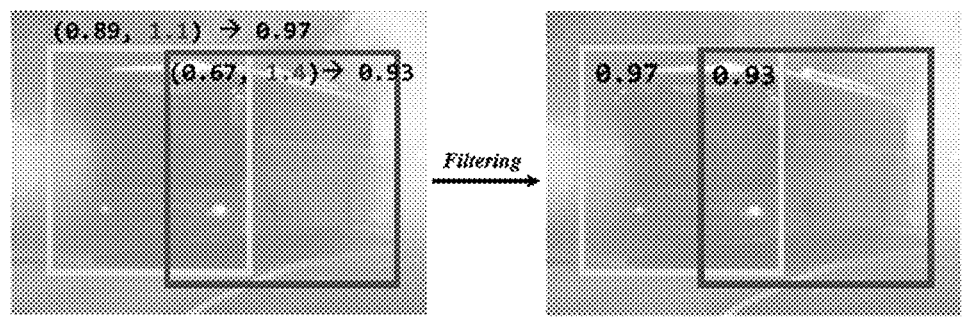

RPN first extracts various region proposals with different anchors and then filters out background regions according to the foreground probabilities, i.e., objectness. However, in the domain adaptation scenario, the predicted objectness on the target domain is not reliable since the foreground discriminator is biased toward the source domain. As a result, the informative region proposals may have a low objectness score, and they may be removed during the proposal selection process (e.g., non-maximum suppression). To alleviate this problem, the entropy of the output domain probability may be exploited to estimate the transferability of each region proposal. Concretely, the entropy of each region proposal may be calculated as $E_{i,r} = H\;(b_{i,r})$, where high entropy indicates that the box is not distinguishable in terms of the domain. Next, the obtained domain transferability $E_{i,r}$ may be multiplied by the score from the objectness classifier oi, $=D_{cls}(G_{rpn}(\hat{\Phi}_{i,L}))$, deriving the re-weighted objectness score $\tilde{s}_{i,r} = s_{i,r} \cdot E_{i,r} \cdot G_{rpn}$. Afterwards, the non-maximum suppression (NMS) may be conducted to remove overlapping regions considering their re-weighted objectness scores. As illustrated in FIG. 4, a filtering strategy according to the present disclosure may preserve informative regions by respecting the transferability.

For instance-level adaptation, previous methods adopt the selected region proposals for RoI pooling from both domains: (1) source domain, which uses refined region proposal via ground-truth and (2) target domain, which samples the fixed top-N ranked region proposals (e.g., N=300). However, this setting brings a negative effect due to the inaccurate target instances(proposals) in early training steps. Therefore, in the present disclosure, the dynamic instance sampling (DIS) may be included, which adjusts N in accordance with both the discrepancy of foreground probability and the image hardness score. Firstly, KL divergence between foreground probabilities of regions from source and target domain may be measured. The KL divergence may be utilized to estimate the relative perplexity of the model on the target domain compared to the source.

The complement of the divergence may be estimated as $(1-KL(s_r^s, s_r^t))$, where $KL(\cdot)$ denotes the KL divergence, and $s_r^s$ and $s_r^t$ are the foreground probability of selected r-th region proposal in the source domain image and target domain image, respectively.

Moreover, it may be conjectured that the model should have higher recall rate as the target feature gets closer to the source domain. From this intuition, the domain probability of the image may be considered as additional control parameter of N. The domain probability, i.e., the hardness score, may be measured with an auxiliary domain discriminator $D_d$s trained to distinguish the domain of multi-scale fused feature $P_f$. The final number $N_{final}$ of samples $N_{final}$ for the target image $X^t \in X_t$ may be calculated as: $N_{final}=[N \times 0.5\;(D(p_f^t)+(1-KL(s_r^s,s_r^t)))]$, where [·] denotes the floor function. During training, $N_{final}$ may gradually increase since the divergence $KL(s_r^s,s_r^t)$ decreases via gradient reversal layers in the overall network.

Total losses may consist of the detection loss and adversarial losses in each layer which is defined as $\mathcal{L}_{adv} = \mathcal{L}_{image} + \mathcal{L}_{box} + \mathcal{L}_{instance}$. The overall objective function may be defined by the following Equation 5:

$$\max_{\{D\}} \min_{F,D_{dis}} \mathcal{L}_{det} + \lambda \cdot \mathcal{L}_{adv} \quad \text{[Equation 5]}$$

where {D} denotes a set of domain discriminators in the overall network but $D_{dis}$, i.e., $\{D_f, D_{cls}, D_{box}\} \subset D$, while F is the feature extractors. During inference, DIS and adversarial training may not be conducted while MUA and the transferable regions are estimated.

Hereinafter, test results for a domain adaptive object detection method according to the present disclosure will be described in detail with reference to FIGS. 5 to 10.

Here, five datasets Cityscape, Foggy-Cityscape, KITTI, Sim10 k, and BDD100 k may be used to evaluate model performance according to the present disclosure, and they may be represented as in the following Table 1.

TABLE 1

| Dataset name | Dataset description | Number of detected objects |
| --- | --- | --- |
| Cityscape | Street scenes of 50 different cities in Germany. Consists of 2,975 training data images and 500 test data images. | 8 |
| Foggy-Cityscape | A synthetic dataset derived by synthesizing a Cityscape dataset and a foggy weather. Same data structure as Cityscape | 8 |
| BDD100K | A large-scale driving dataset including various conditions (weather, time, location) | 7 |
| KITTI | A low picture quality dataset collected from streets and highways in Germany. Consists of 7,481 training data images | 1 |
| Sim10K | A virtual driving dataset rendered from the Grand Theft Auto (GTA). The dataset consists of 10,000 images with 58,701 box labels. | 1 |

For fair comparison, VGG-16 based Faster R-CNN may be adopted along with RoIAlign. The initial learning rate may be set to 1e-3 and fixed during the first 50 k iterations and then decayed by 1e-4 after every 20 k iterations. For optimization, the stochastic gradient descent (SGD) optimizer with the momentum of 0.9 may be adopted. Each image may be resized to have a vertical length of 600 pixels while preserving the aspect ratio. A single batch may contain two images, one for each domain. For Sim10K-to-Cityscapes, X may be set to 0.1 whereas it may be set to 1 for other domain adaptation scenarios. It may be implemented with PyTorch. The model may be trained and tested on a single GTX2080Ti.

The effectiveness of the method according to the present disclosure may be validated on various unsupervised domain adaptive object detection benchmarks. As shown in the upper part of FIG. 5, the method according to the present disclosure outperforms previous methods by achieving the new state-of-the-art performance of 41.3% on Cityscapes-FoggyCityscapes. Particularly, the method according to the present disclosure may yield a remarkable performance gain on large instances (e.g., Truck, Bus, and Train). This is due to the multi-scale feature fusion strategy and TRPN, which enhances the global image representation ability and the objectness accuracy. Moreover, the method according to the present disclosure surpasses the previous methods on the Cityscapes-to-BDD100K benchmark by a large margin of 3.1%. Notably, the detection performance on small instances (e.g., Person and Bicycle) is largely improved despite the challenging nature of BDD100K. Even on the car-only adaptation scenarios in FIG. 6, i.e., KITTI-to-Cityscapes and Sim10 k-to-Cityscapes, the method according to the present disclosure outperforms the previous state-of-the-arts achieving the mAP of 44.2% and 47.1%, respectively.

Figure 7:
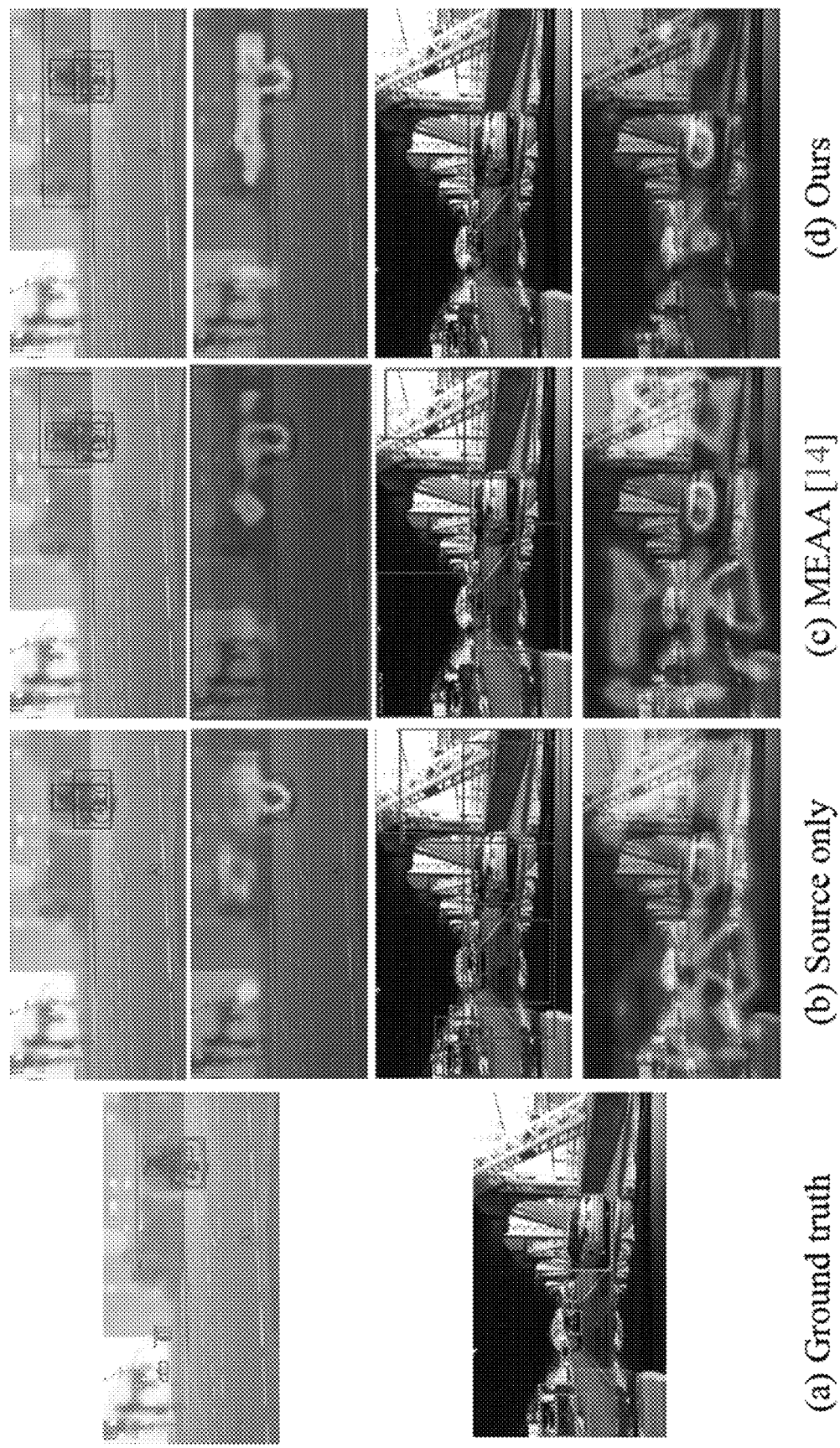

FIG. 7 depicts qualitative results of Cityscapes-to-FoggyCityscapes and Cityscapes-to-BDD100K for better comparison. Heavy fogs in the target domain may disturb accurate recognition, especially distant objects as shown in (a) of FIG. 7. MEAA better detects objects than the baseline with the help of the local-level attention map but still fails to capture some objects due to the noisy activation (second and fourth rows). For instance, a large bus in the first sample may be partially detected with low confidence, and distant cars may be ignored in the second image. On the contrary, the method according to the present disclosure may capture almost all the objects well. To be specific, the large bus may be accurately detected since the transferable region proposal network (TRPN) effectively minimizes the domain gap of the objectness distributions from anchors with various shapes. In addition, the multi-scale-aware uncertainty attention (MUA) provides local and global image information enabling the model to capture small cars in the second sample without false positive boxes.

Ablation studies may be conducted to validate the effectiveness of the components: MUA, TRPN, and DIS proposed in the present disclosure. As shown in FIG. 8, each component contributes to the performance improvement. It is observed that the transferable region guidance from MUA benefits the performance on all categories improving mAP by 0.8%. For deeper analysis on TRPN, it may be splitted into two parts: RPN-level Domain Adaptation (RDA) and Re-Weighted Objectness (RWO). The results shown in the third and fourth rows demonstrate the significance of RDA, improving the performance by 1.3%. In addition, RWO contributes to more accurate detection by complementing the objectness with the entropy of region proposals. Furthermore, Dynamic Instance Sampling (DIS) enhances the model effectively by incorporating the extent of the domain gap into the region sampling process. To summarize, all components are beneficial and can be combined to complement each other, since they are designed considering the domain gap in each level of the object detection pipeline.

Figure 9:
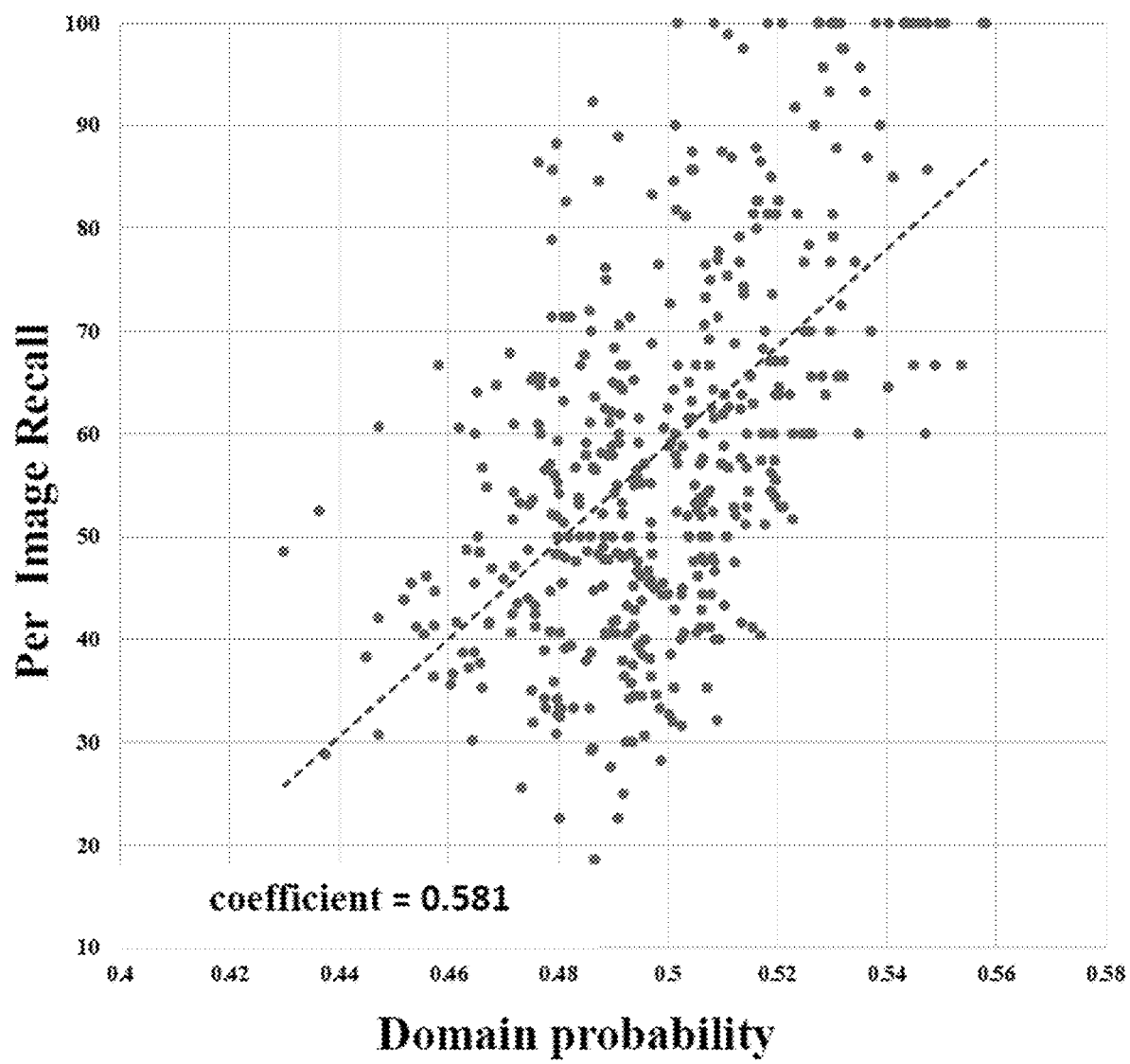
Figure 10:
Figure 10:
Figure 10:
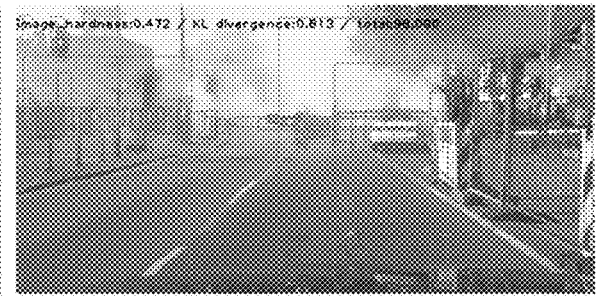

Moreover, it is possible to experimentally validate the motivation of DIS that the recall rate should increase as the target feature gets close to the source domain. FIG. 9 displays the scattered plot of 500 images from the target domain where X-axis and Y-axis are the domain probability and the recall rate, respectively. To investigate the relationship between the recall rate and the domain probability, the Pearson correlation coefficient may be measured. As a result, the measured correlation is 0.58 indicating there exists strong positive relationship. The dynamic instance sampling (DIS) according to the present disclosure calibrates N, i.e., the number of region proposals to be selected, considering the output domain probability of the target domain image. The effect of DIS may be qualitatively analyzed with reference to FIG. 10. As shown in (b) of FIG. 10, common top-N sampling strategy selects unpropitious region proposals including backgrounds, due to the large domain gap. On the contrary, DIS automatically adjusts Nriw, so background regions are excluded while foreground regions are selected.

The domain adaptive object detection method according to the present disclosure may include a novel framework composed of three components: multi-scale-aware uncertainty attention (MUA), transferable region proposal networks (TRPN), and dynamic instance sampling (DIS) for each level. Respecting the pipeline of object detector, the domain adaptive object detection method according to the present disclosure effectively aligns the domain gap in overall levels and delivers transferable regions to maximize transferability as well as discriminability for DAOD. Through extensive experiments, the effectiveness of the domain adaptive object detection method according to the present disclosure may be validated, achieving state-of-the-art performance in various domain adaptation scenarios.

Figure 11:
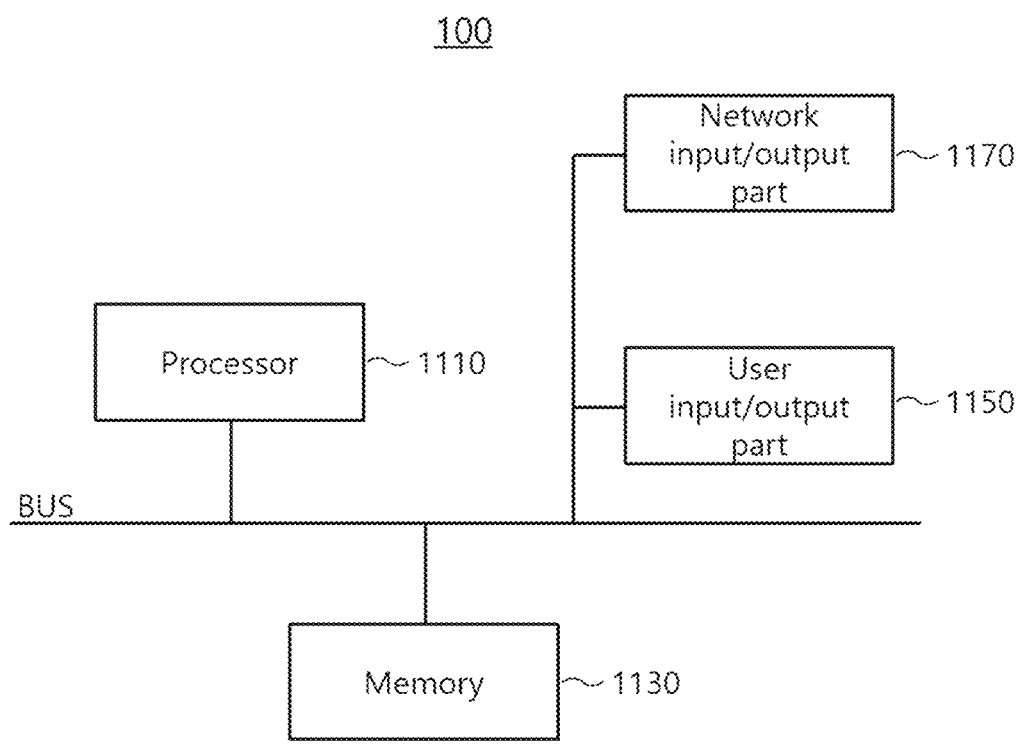
FIG. 11 is a diagram illustrating a system configuration of the domain adaptive object detection apparatus according to the present disclosure.

FIG. 11 is a diagram illustrating a system configuration of the domain adaptive object detection apparatus according to the present disclosure.

Referring to FIG. 11, the domain adaptive object detection apparatus 100 may include a processor 1110, a memory 1130, a user input/output part 1150, and a network input/output part 1170.

The processor 1110 may execute a domain adaptive object detection procedure according to an embodiment of the present disclosure, manage the memory 1130 read or written in this process, and schedule synchronization time between volatile memory and nonvolatile memory in the memory 1130. The processor 1110 may control the overall operation of the domain adaptive object detection apparatus 100, and may be electrically connected to the memory 1130, the user input/output part 1150, and the network input/output part 1170 to control the data flow among them. The processor 1110 may be implemented as a central processing unit (CPU) of the domain adaptive object detection apparatus 100.

The memory 1130 may include an auxiliary storage device that is implemented as nonvolatile memory such as solid state disk (SSD) or hard disk drive (HDD) and used to store overall data and a main storage device that is implemented as volatile memory such as random access memory (RAM). Also, the memory 1130 may be executed by the processor 1110 electrically connected to it to store a set of commands for executing the domain adaptive object detection method according to the present disclosure.

The user input/output part 1150 may include an environment for receiving user input and an environment for outputting specific information to the user—for example, an input device including an adaptor, such as a touchpad, a touchscreen, an on-screen keyboard, or a pointing device, and an output device including an adapter, such as a monitor or a touchscreen. In one embodiment, the user input/output unit 1150 may correspond to a computing device connected through a remote connection, and, in such case, the domain adaptive object detection apparatus 100 may be implemented as an independent server.

The network input/output unit 1170 provides a communication environment for connecting to a user terminal 1210 through a network, and may include, for example, an adapter for communications such as a local area network (LAN), a metropolitan area network (MAN), a wide area network (WAN), and a VAN (Value Added Network). Also, the network input/output unit 1170 may be implemented to provide a short-range communication function such as WiFi and Bluetooth or a 4G or higher wireless communication function, for wireless transmission of data.

Figure 12:
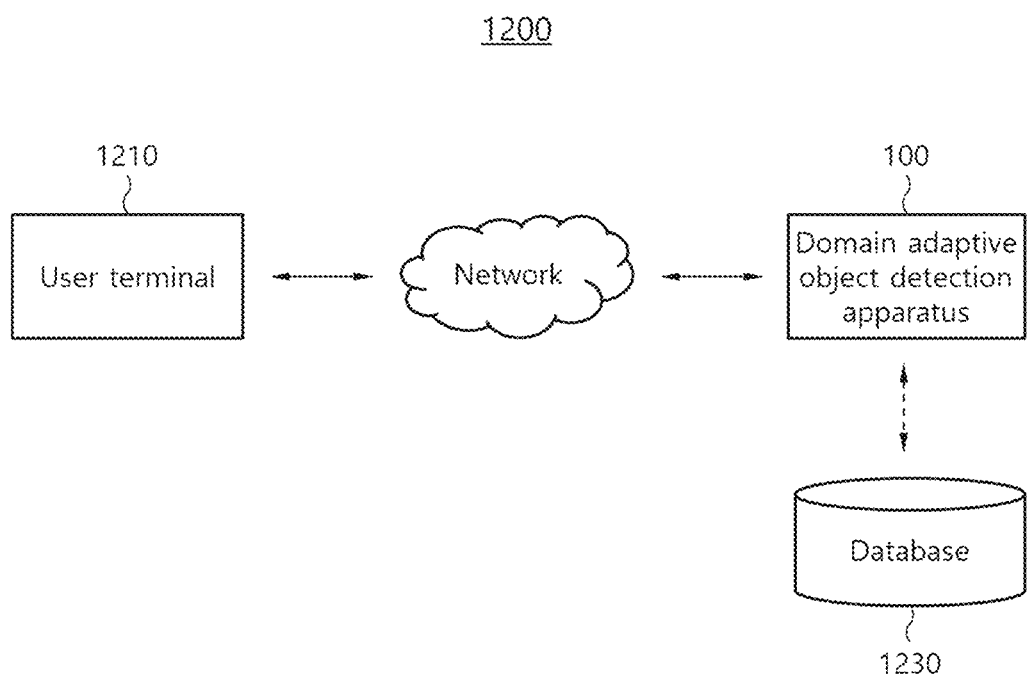
FIG. 12 is a diagram illustrating a domain adaptive object detection system according to the present disclosure.

FIG. 12 is a diagram illustrating a domain adaptive object detection system according to the present disclosure.

Referring to FIG. 12, the domain adaptive object detection system 1200 may include a user terminal 1210, a domain adaptive object detection apparatus 100, and a database 1230.

The user terminal 1210 may correspond to a terminal device operated by a user. In an embodiment of the present disclosure, the user may be understood as one or more users, and a plurality of users may be divided into one or more user groups. Also, the user terminal 1210 is a single device constituting the domain adaptive object detection system 1200, and may correspond to a computing device that operates in conjunction with the domain adaptive object detection apparatus 100. For example, the user terminal 1210 may be implemented as, but not limited to, a smartphone, a laptop, or a computer that is operable by being connected to the domain adaptive object detection apparatus 100, and also may be implemented as various devices including a tablet PC. Also, the user terminal 1210 may be executed by a dedicated program or application (or app) installed on it to interface with the domain adaptive object detection apparatus 100.

The domain adaptive object detection apparatus 100 may be implemented as a server corresponding to a computer or program that performs the domain adaptive object detection method according to the present disclosure. Also, the domain adaptive object detection apparatus 100 may be connected to the user terminal 1210 over a wired network or a wireless network such as Bluetooth, WiFI, and LTE, and may transmit and receive data to and from the user terminal 1210 via the network.

Moreover, the domain adaptive object detection apparatus 100 may be implemented to operate by being connected to an independent external system (not shown in FIG. 1) in order to perform a related operation. For example, the domain adaptive object detection apparatus 100 may be implemented to provide various services by interfacing with a portal system, an SNS system, a cloud system, etc.

The database 1230 may correspond to a storage device that stores various information required in the process of operating the domain adaptive object detection apparatus 100. For example, the database 1230 may store information on images and information on data and models, but not limited thereto, and may store information that is collected or processed in various forms in the process in which the domain adaptive object detection apparatus 100 performs the domain adaptive object detection method according to the present disclosure.

In addition, although FIG. 12 illustrates the database 1230 as an apparatus independent from the domain adaptive object detection apparatus 100, but not limited thereto, and it is needless to say that it may be implemented as a logical storage device by being included in the domain adaptive object detection apparatus 100.

Although the present disclosure has been described with reference to the exemplary embodiment, those skilled in the art will understood that the present disclosure may be variously modified and altered without departing from the spirit and scope stated in the following claims.

[Detailed Description of Main Elements]

| | |
|---|---|
| 100: Domain adaptive object detection apparatus | |
| 110: Image-level feature part | 130: RPN-level feature part |
| 150: Instance-level feature part | 170: Object-detection part |
| 190: Controller | |
| 1200: Domain adaptive object detection system | |

What is claimed is:

1. A multi-level transferable region-based domain adaptive object detection apparatus comprising:
    an image-level feature part configured to extract an image-level feature by providing unlabeled target data to a plurality of convolutional layers;
    an RPN-level feature part configured to determine region candidates by providing the image-level feature to a region proposal network (RPN) and performing RPN-level domain adaptation and transferable region filtering; and
    an instance-level feature part configured to extract a region of interest (RoI) pooling feature by conducting dynamic instance sampling on the region candidates,
    wherein the dynamic instance sampling includes dynamically determining a number of the region candidates in a target domain by multiplying a divergence between objectness scores of top N regions of the region candidates from a source domain and objectness scores of top N regions of the region candidates from the target domain by N, and wherein the image-level feature part, the RPN-level feature part, and the instance-level feature part are each implemented via at least one processor.

2. The multi-level transferable region-based domain adaptive object detection apparatus of claim 1, wherein the image-level feature part is further configured to create a transferable attention map by collecting multi-scale features of the unlabeled target data from each of the convolutional layers and fusing the multi-scale features.

3. The multi-level transferable region-based domain adaptive object detection apparatus of claim 2, wherein the image-level feature part is further configured to create the image-level feature by multiplying the transferable attention map by a global feature.

4. The multi-level transferable region-based domain adaptive object detection apparatus of claim 1, wherein the RPN-level feature part is further configured to generate an RPN-level domain feature by fusing a foreground feature outputted from the RPN and a domain-classified feature that has passed through a gradient reversal layer (GRL)-based domain classifier (Dbox).

5. The multi-level transferable region-based domain adaptive object detection apparatus of claim 4, wherein the RPN-level feature part is further configured to determine the region candidates by receiving the RPN-level domain feature and filtering out background regions in the transferable region filtering process.

6. The multi-level transferable region-based domain adaptive object detection apparatus of claim 1, wherein the instance-level feature part is further configured to adjust the number of region candidates based on a discrepancy between foreground probability and an image hardness score.

7. The multi-level transferable region-based domain adaptive object detection apparatus of claim 1, further comprising an object detection part configured to detect an object from the unlabeled target data by providing the RoI pooling feature to deformable convolutional networks (DCN), wherein the object detection part is implemented via at least one processor.

8. A multi-level transferable region-based domain adaptive object detection method comprising:

extracting an image-level feature by providing unlabeled target data to a plurality of convolutional layers;

determining region candidates by providing the image-level feature to a region proposal network (RPN) and performing RPN-level domain adaptation and transferable region filtering; and extracting a region of interest (RoI) pooling feature by conducting dynamic instance sampling on the region candidates, wherein the dynamic instance sampling includes dynamically determining a number of the region candidates in a target domain by multiplying a divergence between objectness scores of top N regions of the region candidates from a source domain and objectness scores of top N regions of the region candidates from the target domain by N.

9. The multi-level transferable region-based domain adaptive object detection method of claim 8, wherein the extracting of an image-level feature comprises creating a transferable attention map by collecting multi-scale features of the unlabeled target data from each of the convolutional layers and fusing the multi-scale features.

10. The multi-level transferable region-based domain adaptive object detection method of claim 9, wherein the extracting of an image-level feature comprises creating the image-level feature by multiplying the transferable attention map by a global feature.

11. The multi-level transferable region-based domain adaptive object detection method of claim 8, wherein the extracting of the RoI pooling feature comprises adjusting the number of region candidates based on a discrepancy between foreground probability and an image hardness score.

12. The multi-level transferable region-based domain adaptive object detection method of claim 8, further comprising detecting an object from the unlabeled target data by providing the RoI pooling feature to deformable convolutional networks (DCN).

13. The multi-level transferable region-based domain adaptive object detection apparatus of claim 1, wherein a first value is obtained by the multiplying of the divergence between the objectness scores of the top N regions of the region candidates from the source domain and the objectness scores of the top N regions of the region candidates from the target domain by N, and wherein the dynamic instance sampling further includes multiplying a domain probability of a domain classifier used to generate a transferable region using multi-scale features by N to obtain a second value and averaging the first value and the second value to obtain the number of the region candidates in the target domain.

* * * * *